US011788950B2

(12) United States Patent
Geiger et al.

(10) Patent No.: US 11,788,950 B2
(45) Date of Patent: Oct. 17, 2023

(54) METHOD AND DEVICE FOR ANALYSING CELLS

(71) Applicant: UNIVERSITÄT ULM, Ulm (DE)

(72) Inventors: Daniel Geiger, Mittelbiberach (DE); Tobias Neckernuss, Eislingen (DE); Othmar Marti, Ulm (DE)

(73) Assignee: Universität Ulm, Ulm (DE)

( * ) Notice: Subject to any disclaimer, the term of this patent is extended or adjusted under 35 U.S.C. 154(b) by 933 days.

(21) Appl. No.: 16/479,689

(22) PCT Filed: Jan. 26, 2018

(86) PCT No.: PCT/EP2018/051986
§ 371 (c)(1),
(2) Date: Jul. 22, 2019

(87) PCT Pub. No.: WO2018/138279
PCT Pub. Date: Aug. 2, 2018

(65) Prior Publication Data
US 2021/0325293 A1    Oct. 21, 2021

(30) Foreign Application Priority Data
Jan. 26, 2017   (DE) .................... 10 2017 201 252.8

(51) Int. Cl.
*G01N 15/14*   (2006.01)
*G06T 7/00*   (2017.01)
(Continued)

(52) U.S. Cl.
CPC .......... *G01N 15/1475* (2013.01); *G01N 1/40* (2013.01); *G01N 15/1431* (2013.01);
(Continued)

(58) Field of Classification Search
CPC .................... G06T 2207/30024; G06T 7/0012
See application file for complete search history.

(56) References Cited

U.S. PATENT DOCUMENTS 4,173,415 A * 11/1979 Wyatt ................ G01N 15/1459
356/336
6,473,698 B1   10/2002 Albert et al.
(Continued)

FOREIGN PATENT DOCUMENTS

CN    102564920 A    7/2012
CN    103926190 A    7/2014
(Continued)

OTHER PUBLICATIONS

Guck et al., "Optical Deformability as an Inherent Cell Marker for Testing Malignant Transformation and Metastatic Competence," *Biophysical Journal* 88(5): 3689-3698 (2005).
(Continued)

*Primary Examiner* — Guillermo M Rivera-Martinez
(74) *Attorney, Agent, or Firm* — Leydig, Voit & Mayer, Ltd.

(57) ABSTRACT

Disclosed is a method for analysing cells, in which cells are separated and the individual cells pass via a measurement region of a unit for spatially resolved radiation intensity measurement, wherein, for at least one of the separated cells, when passing via the measurement region, a time sequence of spatial intensity patterns of an electromagnetic radiation emitted from and/or influenced by the cell is created, the optical flow of a respective two of the spatial intensity patterns is calculated for at least one portion of the sequence of intensity patterns using a computer unit, and an evaluation of the calculated optical flows occurs. Also disclosed is a device for analysing cells, comprising a device for separating cells, a unit for spatially resolved radiation intensity measurement, and a computer unit for calculating the optical flow of a respective two of the created intensity patterns, and for evaluating the calculated optical flows.

18 Claims, 4 Drawing Sheets

Figure 1:
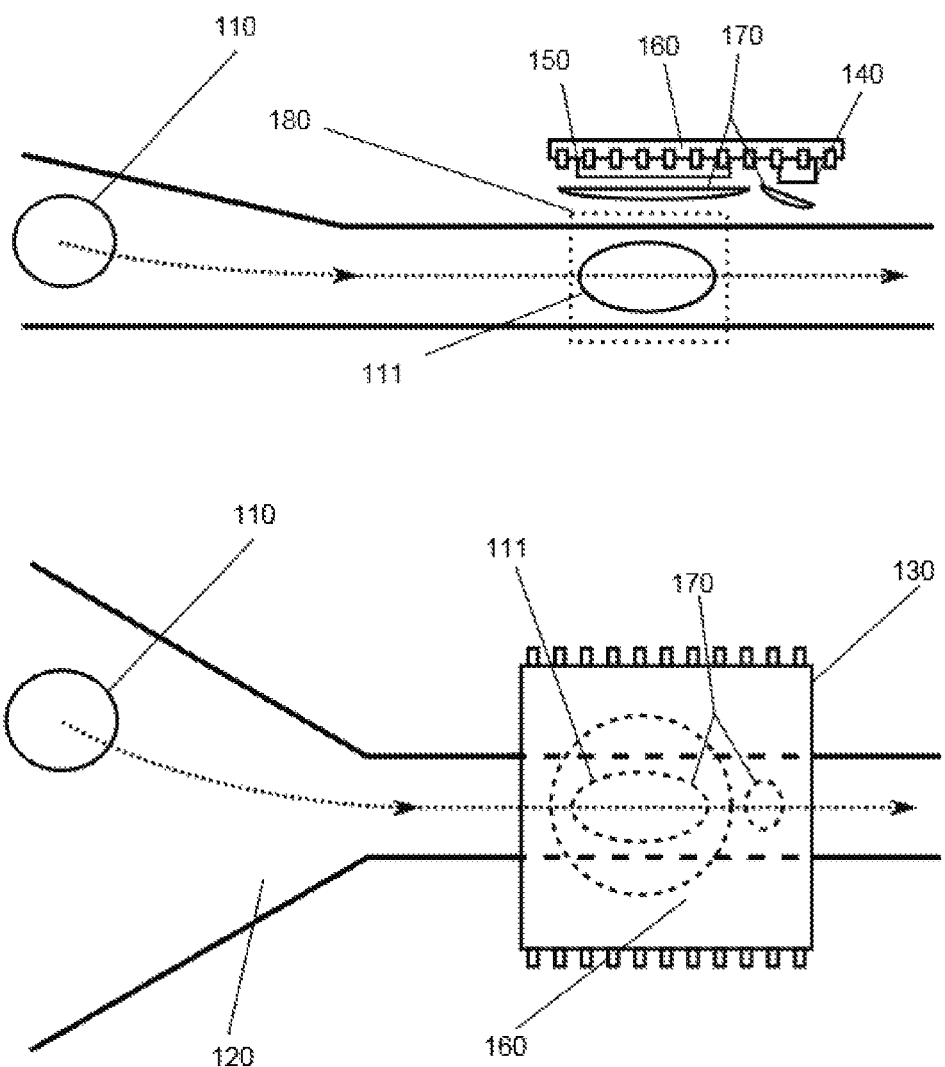

(51) Int. Cl.
*G06T 7/269* (2017.01)
*G01N 1/40* (2006.01)
*G01N 15/00* (2006.01)
*G01N 15/10* (2006.01)

(52) U.S. Cl.
CPC ....... *G01N 15/1436* (2013.01); *G06T 7/0016* (2013.01); *G06T 7/269* (2017.01); *G01N 2015/0019* (2013.01); *G01N 2015/1081* (2013.01); *G01N 2015/1495* (2013.01); *G06T 2207/30024* (2013.01)

(56) References Cited

U.S. PATENT DOCUMENTS

| | | | |
|---|---|---|---|
| 7,911,590 | B2 | 3/2011 | Lacombe et al. |
| 8,331,642 | B2* | 12/2012 | Zerfass ................ G06T 7/0012 436/63 |
| 8,795,497 | B2 | 8/2014 | Sato et al. |
| 2002/0198665 | A1* | 12/2002 | Seul ................... G01N 21/6456 382/128 |
| 2003/0031352 | A1* | 2/2003 | Nelson ................ G01N 33/574 382/131 |
| 2005/0227251 | A1* | 10/2005 | Darnell ............... C12Q 1/6809 435/6.1 |
| 2006/0251371 | A1* | 11/2006 | Schmidt ............. G01N 21/6454 385/129 |
| 2006/0256338 | A1* | 11/2006 | Gratton .............. G01N 21/6428 356/417 |
| 2007/0095669 | A1* | 5/2007 | Lau ......................... B03C 5/005 204/547 |
| 2008/0045848 | A1 | 2/2008 | Lacombe et al. |
| 2008/0221711 | A1* | 9/2008 | Trainer .............. G01N 15/1459 356/338 |
| 2009/0166297 | A1* | 7/2009 | Sweat ................... A61M 1/3693 210/745 |
| 2009/0244536 | A1* | 10/2009 | Mitchell ............ G01N 15/1459 250/573 |
| 2010/0220315 | A1* | 9/2010 | Morrell .............. G01N 15/1436 356/73 |
| 2011/0045993 | A1* | 2/2011 | Kent ................... B01L 3/502776 382/128 |
| 2012/0103813 | A1 | 5/2012 | Sato et al. |
| 2012/0287419 | A1* | 11/2012 | Sharpe ................... G01N 15/14 250/461.1 |
| 2013/0177935 | A1* | 7/2013 | Di Carlo ........... B01L 3/502776 435/29 |
| 2013/0252237 | A1* | 9/2013 | Wagner ................ G01N 15/147 435/6.1 |
| 2013/0316390 | A1 | 11/2013 | Käs et al. |
| 2014/0113324 | A1 | 4/2014 | Di Carlo et al. |
| 2014/0118529 | A1* | 5/2014 | Zheng ...................... G21K 7/00 348/80 |
| 2016/0202172 | A1* | 7/2016 | Guck ................. G01N 15/1484 435/288.7 |
| 2016/0356711 | A1* | 12/2016 | Lumpkin ........... G01N 15/1434 |
| 2017/0227466 | A1* | 8/2017 | Lo ..................... G01N 15/1434 |
| 2019/0323937 | A1* | 10/2019 | Hobel ................. G01N 15/0227 |

FOREIGN PATENT DOCUMENTS

| | | |
|---|---|---|
| CN | 105184853 A | 12/2015 |
| JP | 2005-524831 A | 8/2005 |
| JP | 2007-530197 A | 11/2007 |
| JP | 2015-161670 A | 9/2015 |
| WO | 03/089158 A1 | 10/2003 |
| WO | WO 2012/045716 A1 | 4/2012 |
| WO | WO 2015/024690 A1 | 2/2015 |

OTHER PUBLICATIONS

Issadore et al., "Ultrasensitive Clinical Enumeration of Rare Cells ex Vivo Using a Micro-Hall Detector," *Sci. Transl. Med.* 4(141): 141ra92 (2012).

Lincoln et al., "Deformability-Based Flow Cytometry," *Cytometra Part A 59A*: 203-209 (2004).

Mietke et al., "Extracting Cell Stiffness from Real-Time Deformability Cytometry: Theory and Experiment," *Biophys. J.* 109: 2023-2036 (2015).

Otto et al., "Real-time deformability cytometry: on-the-fly cell mechanical phenotyping," *Nature Methods* 12: 199-202 (2015).

Tse et al., "Quantitative Diagnosis of Malignant Pleural Effusions by Single-Cell Mechanophenotyping," *Sci. Transl. Med* 5(212): 212ra163 (2013).

Xavier et al., "Mechanical phenotyping of primary human skeletal stem cells in heterogeneous populations by real-time deformability cytometry," *Integr. Biol.* 8: 616-623(2016).

German Patent Office, Examination Report in German Patent Application No. 10 2017 201 252.8 (dated Jan. 23, 2018).

European Patent Office, International Search Report in International Application No. PCT/EP2018/051986 (dated Apr. 17, 2018).

European Patent Office, Written Opinion in International Application No. PCT/EP2018/051986 (dated Apr. 17, 2018).

International Bureau of WIPO, International Preliminary Report on Patentability in International Application No. PCT/EP2018/051986 (dated Jul. 30, 2019).

Xue et al., "Quantitative interferometric microscopy cytometer based on regularized optical flow algorithm," *Optics Communications* 350: 222-229 (2015).

Zhang et al., "Micro Vision Based Cell Motility Analyzing Algorithm by Optically-Induced Dielectrophoresis, " *Proceedings of the 2012 IEEE International Conference on Robotics and Biomimetics (ROBIO)*, Dec. 11-14, 2012, Guangzhou, China, pp. 1779-1783 (2012).

China National Intellectual Property Administration, First Office Action in Chinese Patent Application No. 201880008469.6 (dated Sep. 28, 2021).

Japan Patent Office, Notification of Reasons for Refusal in Japanese Patent Application No. 2019-540093 (dated Nov. 24, 2021).

Japan Patent Office, Notification of Reasons for Refusal in Japanese Patent Application No. 2019-540093 (dated Jul. 12, 2022).

China National Intellectual Property Administration, Second Office Action in Chinese Patent Application No. 201880008469.6 (dated Aug. 17, 2022).

China National Intellectual Property Administration, Third Office Action in Chinese Patent Application No. 201880008469.6 (dated Apr. 29, 2023).

\* cited by examiner

METHOD AND DEVICE FOR ANALYSING CELLS

CROSS-REFERENCE TO RELATED APPLICATIONS

This patent application is the U.S. national phase of International Application No. PCT/EP2018/051986, filed on Jan. 26, 2018, which claims the benefit of German Patent Application No. 10 2017 201 252.8, filed Jan. 26, 2017, the disclosures of which are incorporated herein by reference in their entireties for all purposes.

The present invention relates to a method of analyzing cells in which cells are separated, the separated cells pass through a measurement region of a unit for spatially resolved radiation intensity measurement, wherein a time sequence of spatial intensity patterns of an electromagnetic radiation emanating from and/or influenced by the cell is prepared for at least one of the separated cells on the passing through of the measurement region, wherein the optical flow of two respective spatial intensity patterns is calculated for at least a portion of the sequence of intensity patterns with the aid of a processing unit, and wherein an evaluation of the calculated optical flows takes place. The present invention also additionally relates to an apparatus for analyzing cells that includes an apparatus for separating cells, a unit for spatially resolved radiation intensity measurement, and a processing unit for calculating the optical flow of a respective two of the prepared intensity patterns and for evaluating the calculated optical flows.

Cytometry is a method of detecting cells and their properties that is frequently used in medicine and in biotechnology. The application possibilities range from a counting of cells over the detection of different cell types up to the analysis of intrinsic cell parameters such as the mechanical properties or the measurement of the DNA content of individual cells. The results from these methods are today indispensable in medical diagnostics and are likewise the basis of targeted therapeutic approaches (inter alia: leukemia, identification of metastases).

The different techniques can be roughly divided into two categories. The so-called image cytometers analyze a sample of cells with the aid of a video microscope setup. In this process, different parameters of the cells are analyzed via image processing. This method is particularly suitable for adherent cells since they do not move during the measurement. The problem of the arrangement of suspended cells is avoided in flow cytometry in that the cells are led past the measurement unit in a microfluidic channel. This is the most widespread method in research and diagnostics and is divided into further subdivisions depending on the kind of detection method used.

The standard method of a flow cytometer is based on the detection and analysis of scattered laser light at cells. In this process, both the light scattered in a forward direction (for size determination) and the laterally scattered light (morphological anomalies) are detected and analyzed. To achieve a higher specificity, the cells can be marked with fluorescent dyes in this method. Cells that only differ slightly from one another visually, but that nevertheless have a different biochemistry, can thereby also be distinguished.

A somewhat more recent approach to flow cytometry comes from Lincoln (B. Lincoln et al., Cytometry Part A 2004, 59A, 203-209) and was technically implemented at a laboratory scale by e.g. von Jochen Guck (O. Otto et al., Nature Methods 2015, 12, 199-202; WO 2015/024690 A1; J. Guck et al., Biophysical Journal 2005, Vol. 88, 3689-3698; WO 2012/045716 A1). The application in the medical diagnostic sector was also analyzed (H. T. K. Tse et al., Sci. Transl. Med. 2013, 5, 212ra163, DOI: 10.1126/scitranslmed.3006559). The cells here are not identified on the basis of optical and fluorescent properties, but rather due to different cell mechanics. Different cell types have in part substantial differences in their stiffness. The deformation of a cell at known forces can consequently also be a specific cell marker. For this purpose, the cells are conducted through a microfluidic channel at high speed. Different forces act on the cell wall due to the pressure gradient over the channel. The cell wall is generally sheared to the rear against the direction of flow. The appearance of the cell thereby changes from round over elliptical to bullet shape. These different shapes depend on the cell size and on the elasticity at a given speed. The channel is observed by a high speed camera. An algorithm detects the shape and thus both the size and deformation of the cell from the images.

An optical stretcher is likewise an instrument with whose aid the mechanical properties of suspended cells can be measured (J. Guck et al., Biophysical Journal 2005, Vol. 88, 3689-3698). Cells are here captured by two laser beams in a microfluidic channel. If the intensity of the laser is increased, the cells are pulled apart in the direction of the laser beams due to their refractive index that is different from the medium. This procedure (and equally the procedure of relaxation after the stretching) is recorded by the camera and the shape or the deformation of the cell is determined using an algorithm. The characterization takes place with the aid of so-called creep diagrams in which the deformation is applied over the time. Cells of different stiffness can be identified with reference to these diagrams.

A further possible approach for a cytometer includes an immunochemical marking of the cells sought by magnetic nanoparticles (D. Issadore et al., Sci. Transl. Med. 2012, 4(141), 141ra92). A miniaturized Hall sensor is used for the detection. Even very few cells in a large sample can be detected using this method.

There are likewise different approaches for the sorting of cells. The sorting is typically preceded by a detection step with reference to which a controllable gate is activated. This kind of sorting can be most easily explained for the example of FACS (fluorescence activated cell sorting). The cells to be sorted are marked with a fluorescent dye. They are illuminated by a laser in the microfluidic channel and are categorized in accordance with the detected signal. In the further course of the channel, the geometry is selected such that the liquid separates into individual drops with ideally one cell therein. The drop is provided with an electrical charge and an electrode directs it into one of two channels depending on the cell type. The recently developed RACS method that uses the Raman signal of a cell as the criterion for a decision instead of fluorescence is also based on a similar principle.

The sorting procedures that are based on mechanical properties rely on a completely different approach. Cells of different deformability are separated from one another by a combination of different constrictions in the channel or by a widening into a region having columns at different close distances. The dimensions of the sorting unit, however, here always have to be adapted to the analyzed cell size and elasticity.

More or less only the flow cytometry based on scattered light is used for commercial analyses. Different cell types can be distinguished by size and morphology by this method, which is used, for example, to prepare a hemogram. Any insufficient specificity is avoided by an additional fluorescence analysis step or by a manual analysis of a smear. These instruments are technically sophisticated and can be operated by medical staff.

The mechanical properties of cells have become more and more important in recent years. Metastasizing tumor cells, for example, frequently have increased elasticity. They can therefore migrate through tissue into different parts of the body, can adhere there, and can continue to grow. An analysis of cells with respect to their mechanical properties is therefore an important point in the diagnosis and in the determination of the stage of some tumor diseases. The deformation-sensitive instruments for detecting or sorting have to date not come beyond the status of the "Proof of Principle" (M. Xavier et al., Integer. Biol. 2016, 8, 616; A. Mietke et al., Biophysical Journal 2015, Vol. 109, 2023-2036).

The following substantial disadvantages must be named for the most widespread method that is based on scattered light detection in combination with fluorescence detection. The purchase costs of such a commercial instrument are already enormously high in a very simple design and are thus only economical for centralized analysis laboratories. This is above all due to the fact that, on the one hand, the required light sources and detection systems using fluorescence filter kits are very cost-intensive and, on the other hand, the degree of mechanization is enormously high to keep the application hurdle as low as possible. The latter is above all due to the complexity of the method. It is additionally a disadvantage with this method that a marking of the cell type to be measured has to take place by means of a specific fluorescent dye under certain circumstances. Such a system admittedly has a high selectivity with respect to specific proteins, but it cannot recognize any change of, for example, the mechanical cell properties (only sensitive with respect to the protein frequencies sought). A great disadvantage of this technique is the great measurement uncertainty in pathological samples that frequently have to be manually categorized.

The "Real time deformability cytometry" (RT DF) sensitive to the cell mechanics (O. Otto et al., Nature Methods 2015, 12, 199-202) likewise has product-specific restrictions. Since the detection is based on the evaluation of images, the complete setup has to be positioned on a microscope of the best quality. A high speed camera has to be connected to it for the image recording. Both instruments are very expensive to purchase and can each be in the range of several ten thousands of euros. The simple purchasing costs for a complete instrument thus currently amount, according to the developer, to approximately €150,000 (incl. microscope) and are thus even higher than for a fluorescence-based instrument. Every measurement requires a sample treatment to adapt the viscosity and the concentration. In addition, the microscope, the camera, the pump system, and the microfluidic channel always have to be correctly adjusted since e.g. high resolution microscopes always react very sensitively in sharpness and contrast to non-optimum settings. This at least requires expensively trained or even highly qualified laboratory personnel. A scalability is likewise only present with great restrictions due to the mechanical restrictions and the high financial requirement. The processing capacities in real time are likewise limited with modern computer technology due to the three-dimensional data structure of the images. At the same time, a processing latency is hereby adopted, which impairs the use as a sorting device since latency results in reduced selectivity. According to the literature, cell rates of approximately 1,000 cells/s are reached (O. Otto et al., Nature Methods 2015, 12, 199-202). This is not enough to, for example, analyze large quantities of blood. A scaling or a parallelization of the methods would therefore be desirable, which, however, as already mentioned above, is not easily possible. The final analysis result is present with a latency of approximately 15 minutes according to the manufacturer, which prevents real time monitoring.

The Raman spectroscopic cytometry that is based on the specific Raman signal of a cell and, like deformation cytometry, is marker-free, likewise has substantial restrictions. This setup is also very expensive to purchase since the Raman signal strength is very low and an enormous effort thus has to be expended for amplification and noise reduction. The signal-to-noise ratio is in the middle single-digit range in the normal case with integration times below one second. The maximum throughput of such a unit thus results as approximately 1 cell/s. Due to the high purchasing costs and dimensions of the detectors (they have to be cooled to improve the signal-to-noise ratio), a scalability is likewise only possible to a very limited extent.

The disadvantages of the optical stretcher are likewise similar to those of the other methods. The purchasing costs are more than €250,000 due to the complexity and to the required high performance lasers and detectors. At the same time, the detection rate is limited to approximately 2 cells/s since the cells have to be captured for the measurement and the relaxation thereof after a deformation is observed. This method thus also makes high demands on the hydrodynamic part setup with integrated optical fibers. The stretching forces are very small despite the high laser power, whereby a restriction to relatively soft cell types results. The method furthermore requires a high qualification and attention of the operator since the apparatus reacts extremely sensitively to adjustment imprecisions and the monitoring of the process takes place manually. The system scalability is likewise almost precluded due to the latter point and to the fact that a separate 4 watt single-mode laser is required per stretcher.

In summary, the following disadvantages thus result for the methods known from the prior art:

Conventional Flow Cytometry:
  Requires marking with fluorescent dye or other specific markers to increase the specificity
  Optics are expensive and are therefore likewise only scalable with restriction, from which high investment costs result
  A huge degree of technologization is required to integrate the different measurement systems
  Pathological changes can typically only be manually categorized
  Not suitable as sorters, for example for blood treatment.

Deformation Cytometry
  High investment costs >€150,000
  Scalability is not present due to mechanical restrictions (in addition costs are also scaled with parallelization)
  Adjustment by expert staff is required (microscope, pump system, . . . )
  Comparatively slow measurement technology is not suitable for sorting large cell numbers since parallelization is laborious and/or expensive
  Final analysis result is obtained with a delay of approximately 15 min.

Raman Spectroscopic Cytometry:
  Extremely poor signal strength limits the throughput rate (integration time)
  Raman equipment is even considerably more cost-intensive than all other methods
  Very limited in scalability.

Optical Stretcher:
- Slow detection rate <2 cells/s
- Enormous purchasing costs >€250,000
- Operation is only possible by highly qualified technical personnel
- Restricted to soft cell types since stretching forces are very small
- No scalability present.

Starting from this, it was thus the object of the present invention to provide an inexpensive method for analyzing cells that can be carried out in a simple manner and enables an analysis of the cells at high speed without a marking of the cells with fluorescent dyes or with other specific markers being necessary. In addition, it was the object of the present invention to provide an inexpensive apparatus for carrying out such a method.

This object is achieved by the features of the method and the apparatus described herein, and the advantageous developments thereof.

A method for analyzing cells is thus provided in accordance with the invention in which
a) cells are separated with the aid of a unit for separating cells;
b) the separated cells pass through a measurement region of a unit for spatially resolved radiation intensity measurement, wherein a time sequence of spatial intensity patterns of an electromagnetic radiation emanating from and/or influenced by the cell is prepared for at least one of the separated cells on passing through the measurement region;
c) the optical flow of two respective spatial intensity patterns is calculated for at least a portion of the time sequence of intensity patterns with the aid of a processing unit; and
d) an evaluation of the calculated optical flows takes place.

In the method in accordance with the invention biological cells of all kinds and origins can be analyzed. The cells are here preferably used as suspended cells, with particularly preferably an aqueous suspension of the cells to be analyzed being used. The suspension of cells is particularly preferably allowed to flow through the unit for separating cells, wherein the cells are first separated by this unit and subsequently pass through the measurement region of the unit in an individual or separated manner for the spatially resolved radiation intensity measurement on the flowing through of this unit.

The cells are first separated in step a) of the method, with this taking place with the aid of a unit for separating cells. A physical system, e.g. fluid pipes restricting the cross-section, can serve as such a unit. A microchannel or a microfluid channel can in particular be used as a unit for separating cells. In this case, the cells are separated at the inlet of such a channel as a rule. However, the use of a more complex, physical, chemical and/or optical system for separating cells is also possible just as the use of a system having antibody reactions or the use of optical pincers. A statistical separation by a corresponding dilution of the original suspension is also possible.

Once the cells have been separated, they pass through a measurement region of a unit for spatially resolved radiation intensity measurement in step b) of the method. While the cells pass through the unit for spatially resolved radiation intensity measurement, electromagnetic radiation is emitted by them and/or electromagnetic radiation is influenced by them. This can be achieved, for example, in that the cells are irradiated with electromagnetic radiation while and/or before they pass through the measurement region of the unit for spatially resolved radiation intensity measurement. This radiation can then e.g. be scattered by the cells or can also be modified and emitted again. Subsequently, this (scattered or emitted) radiation can be detected from the unit for spatially resolved radiation intensity measurement. The irradiation of the cells can, for example, take place by simple undefined environmental light such as daylight or conventional room lighting. An irradiation can, however, also take place with a flashlight, a laser, a light emitting diode, or another irradiation source. The irradiation can take place with visible light, with electromagnetic radiation from the UV range, electromagnetic radiation from the IR range, but also with any other form of electromagnetic radiation.

A time sequence of spatial intensity patterns of the electromagnetic radiation emanating from the cell is prepared using the unit for spatially resolved radiation intensity measurement for at least one of the separated cells on passing through the measurement region in step b) of the method. This means that ultimately a measurement is carried out with the aid of the unit for spatially resolved radiation intensity measurement for at least one of the separated cells passing through the measurement region. In this measurement, the emanating electromagnetic radiation from the cell passing through the measurement region is detected at a plurality of points consecutive in time by the unit for spatially resolved radiation intensity measurement, with a spatial intensity pattern being prepared for every single one of the points in time. Such a spatial intensity pattern is here to be understood as the spatial distribution of the intensity of the electromagnetic radiation emanating from and/or influenced by the cell. A detection of which radiation intensity emanates from the individual points of the measurement region while the separated cell passes through the measurement region is therefore ultimately made for different points in time. A one-dimensional or two-dimensional intensity pattern results for every measurement point in time in this manner that describes the spatial distribution of the electromagnetic radiation emanating from and/or influenced by the cell while the cell passes through the measurement region.

The spatial intensity pattern is preferably a two-dimensional intensity pattern. It can, however, also be a one-dimensional intensity pattern.

A time sequence of intensity patterns is prepared for a respective one separated cell. This means that spatial intensity patterns of the same dell are measured at a plurality of different points in time while said cell passes through the measurement region. A time sequence of spatial intensity patterns of the electromagnetic radiation emanating from and/or influenced by a respective one cell thus results. In the event that a time sequence of spatial intensity patterns of an electromagnetic radiation emanating from and/or influenced by the cell is prepared for a plurality of the separated cells on the passing through of the measurement region, it is thus essential that in this respect a separate time sequence of spatial intensity patterns of the electromagnetic radiation emanating from and/or influenced by the cell is prepared for a respective one individual cell of the separated cells. Every single cell can in this manner be analyzed per se separately from the other cells.

The preparation of a time sequence of spatial intensity patterns of the electromagnetic radiation emanating from and/or influenced by a cell is here preferably carried out for a plurality of cells, particularly preferably for substantially all of the cells, that pass through the measurement region. In this case, a separate time sequence of spatial intensity patterns of the electromagnetic radiation emanating from and/or influenced by a cell is prepared for every single one of the cells passing through the measurement region. A separate time sequence of spatial intensity patterns can be obtained in this manner for every one of the cells passing through the measurement region, said time sequence being able to be converted and evaluated in the further method steps c) and d).

The unit for spatially resolved radiation intensity measurement can include a geometrical arrangement of electronic components. This arrangement can preferably comprise a photodiode, a CCD sensor and/or a camera. The unit for spatially resolved radiation intensity measurement can also be a segmented component for radiation intensity measurement. One-dimensional segmentations, e.g. a row of photodiodes, and two-dimensional segmentations, e.g. an arrangement of photodiodes in rows and columns, are conceivable, wherein disaggregations of this shape such as honeycombs would also satisfy the two-dimensional segmentation.

For example, a sensor such as is used in optical mice can be used as the unit for spatially resolved radiation intensity measurement. However, more complex sensors from the camera sector are also conceivable that detect different colors and integrate the intensities of sensor point arrays into an optical pixel with which a piece of information on color and intensity is associated in addition to the spatial information.

The optical flow of two respective ones of the spatial intensity patterns is calculated for at least a portion of the sequence of intensity patterns with the aid of a processing unit in step c) of the method.

The optical flow is a parameter that describes the spatial variation or movement of intensities over time. The optical flow is in this respect as a rule shown as a vector field, with the vectors ultimately representing the spatial progression of intensities between two points in time.

A conversion of the spatial intensity patterns of the respective individual cells prepared in step b) therefore takes place in step c). An optical flow is calculated here in each case from a respective two of the spatial intensity patterns of the time sequence of spatial intensity patterns prepared in step b) that was prepared for a respective one of the cells. A plurality of optical flows that can be evaluated in the subsequent step d) of the method are thus obtained overall for a respective one individual cell.

The optical flow of a respective two of the spatial intensity patterns is preferably calculated for the total sequence of intensity patterns (for a respective one cell) with the aid of a processing unit in step c). A respective optical flow can here be prepared, for example, for all the spatial intensity patterns of the time sequence directly consecutive in time. It is, however, alternatively also possible only to calculate the optical flows for a portion of the time sequence of intensity patterns, which means that not all of the prepared spatial intensity patterns are used in the calculation of the optical flows.

The evaluation of the optical flows calculated in step c) finally takes place in step d) of the method. In this respect, a conclusion can be drawn on specific properties of the cell e.g. by the optical flows determined for a cell. Every single cell can thus be analyzed per se with respect to individual properties on this basis. In other words, a conclusion on the properties of the individual cell can be drawn by means of the evaluation of the calculated optical flows. These properties can e.g. be the shape of the cell, the cell size, the cell volume, the cell type, or the morphology or deformation of the cell. Biochemical components of the cell such as dyes can furthermore be quantitatively detected.

For example, a conclusion can first be drawn from the calculated optical flows in the evaluation on the dimensions and on the morphology of the cell and on its deformation and a conclusion can be drawn on the mechanical properties from this. A simple distinguishing of the cell types can furthermore take place by the dimensions of the cell. The determination of the mechanical properties is based on a suspended cell in a liquid moving through a microfluidic channel in such a way that it is deformed perpendicular to the channel due to the speed gradient. This deformation is e.g. dependent on the relative size of the cell with respect to the channel and on its mechanical properties, specifically on the shear modulus.

The key feature of the invention is thus based on the analysis of cells by means of the determination and evaluation of the optical flow of the electromagnetic radiation emanating from and/or influenced by the cells to be analyzed. Specific properties of the cells can be deduced from the calculated optical flows by means of evaluation. The use of the concept of the optical flow here permits a huge reduction of the data volume. A simple system scalability is furthermore present.

The concept of the optical flow is above all known from the use of optical mice. The principle of such a sensor is based on a CCD chip recording the image of the support illuminated by a light source. If the sensor moves relative to the support, the image on the sensor changes. How the gray values have been displaced between two images is determined with the aid of the OF algorithm (OF=optical flow). The direction in which which portion of the gray value has been displaced is calculated in this respect and thus a subpixel resolution is achieved. To determine the net movement, the optical flow is averaged or summed both in the x direction and in the y direction over the total sensor.

A distinguishing of individual cells on the basis of their properties such as their mechanical properties, morphology, and size is possible with the present invention. Different cell types can be distinguished, but pathological cell changes can also be detected. The theoretical detection limit is a single pathological cell due to the individual measurement of every single cell.

At a conventional frame rate for commercially available sensors, a possible measurement throughput of more than 1000 cells/s results for the method in accordance with the invention. The costs of the apparatus or units required in the method are very small. The method in accordance with the invention is thus extremely inexpensive and enables an analysis of the cells at a high speed.

The evaluation of the optical flows in the method in accordance with the invention can take place in real time due to the very high measurement throughput or the high measurement speed and additionally due to the calculation of the optical flows that can be carried out fast. This means that specific properties of the individual cells can be determined directly during the measurement. This has the consequence that the cells can already be subjected to a cell sorting step without any substantial time delay after the passing through of the measurement region of the unit for spatially resolved radiation intensity measurement, in which cell sorting step the individual cells are divided or sorted into different groups with reference to the property or properties determined in the evaluation.

The mechanical dimensions of the units used in the method are furthermore extremely small. As already mentioned, the processing unit and the unit for spatially resolved radiation intensity measurement together fit on a common computer chip.

A marking of the cells to be analyzed with fluorescent markers or with other specific markers is not necessary since the determination and evaluation of the optical flow in accordance with the invention does not require the use of such markers. The method in accordance with the invention can also be carried out more simply for this reason since the complicated experimental step of providing the cells with fluorescent markers can be dispensed with.

The simple performability of the method in accordance with the invention additionally also results from the fact that the use of complicated instruments and apparatus such as special microscopes and pump systems can be dispensed with.

Both the waiting period between two measurements and the measurement time itself can be reduced overall by the simple setup and the small mechanical demands. The setup becomes simpler to handle and a hand-held device is, for example, also conceivable that can be used outside specialized laboratories.

A preferred variant of the method in accordance with the invention is characterized in that the evaluation of the calculated optical flows is carried out in step d) by the processing unit or by an additional unit for evaluating the calculated optical flows; or the evaluation of the calculated optical flows is carried out in step d) partially by the processing unit and partially by an additional unit for evaluating the calculated optical flows.

Since both the calculation of the optical flows and their evaluation are carried out by the processing unit, the space and also the costs for a further device for the evaluation can be saved, whereby the method becomes even more space saving and less expensive. In addition, the method is in this manner independent of additional external units and can thus also be carried out with the aid of a portable apparatus. The use of an additional unit for evaluating the calculated optical flows in contrast makes complicated evaluation processes possible and thus also better analysis possibilities. A graphical evaluation is also possible in this manner. The additional unit for evaluating the calculated optical flows can, for example, be a computer, preferably having special software for the evaluation.

In accordance with a further preferred embodiment of the method in accordance with the invention, at least one property of the cell is determined in the evaluation of the optical flows in step d) that is preferably selected from the group comprising the shape of the cell, the cell size (or the length and width of the cell), the cell volume, the cell type, the morphology or deformation of the cell, and combinations thereof.

A further preferred variant is characterized in that at least one of the separated cells is irradiated with electromagnetic radiation on the preparation of the time sequence of intensity patterns in step b), with the irradiation preferably taking place by a natural radiation source and/or by an artificial radiation source. The artificial radiation source is here in particular selected from the group comprising coherent radiation sources, partially coherent radiation sources, incoherent radiation sources, dot-shaped radiation sources, areal radiation sources, and combinations hereof. The radiation source can e.g. be a laser. An irradiation of the cells by means of dark field illumination is also possible.

In accordance with a further preferred method variant, so many intensity patterns for a respective one cell are prepared on the preparation of the time sequence of spatial intensity patterns in step b) that as few discontinuities as possible occur in the optical flows to be evaluated. This is preferably achieved in that $$fps[\text{pattern/second}] > V[\text{pixels/second}]$$

applies to the frame rate (number of intensity patterns recorded within a second, fps) with respect to the cell speed. The pattern number N for a complete passage of a cell here results from $$N \text{ [pattern]} = (\text{cell size [pixels]} + \text{Detector length [pixels]}) \cdot \frac{fps \text{ [patterns/second]}}{v \text{ [pixels/second]}}$$

The detector length here describes the number of pixels of one direction on the detector. In this manner, discontinuities that can occur in the signals or optical flows to be evaluated are avoided as much as possible, from which a qualitative improvement of the analyses results.

A further preferred variant of the method in accordance with the invention is characterized in that at least one property is determined from a plurality of cells, preferably from all the cells, that pass through the measurement region of the unit for spatially resolved radiation intensity measurement and in that the cells are sorted with the aid of a cell sorter, preferably of a controllable gate, into at least two groups subsequently to step d) on the basis of differences in this at least one property. The cells can be sorted into different groups directly after the evaluation of the optical flows taking place in real time in step d) due to the high analysis speed in the method in accordance with the invention. The sorting takes place here on the basis of the properties analyzed in the method. This, for example, permits a separation of healthy and pathological blood cells for high cell numbers. A particularly fast and favorable sorting of cells is thus possible with this variant of the method in accordance with the invention without the cells having to be provided for this purpose with fluorescent marks or other special markers.

In accordance with a further preferred variant of the method in accordance with the invention, a time sequence of images of the separated cells passing through the measurement region is prepared for at least one of the cells in step b). In this respect, the optical flow of a respective two images (consecutive in time) is then subsequently calculated for at least a part of the time sequence in step c). In this embodiment, the spatial intensity patterns are therefore (two-dimensional) images.

A further method variant is characterized in that some of each cell is hidden on the passing through of the measurement region such that the electromagnetic radiation emanating from this portion of the cell does not reach the unit for spatially resolved radiation intensity measurement. This can be implemented, for example, in that a part of the direct path between the sensor and the measurement region of the unit for spatially resolved radiation intensity measurement is correspondingly blocked, e.g. by masking. On the use of a microfluidic channel, a part of the channel can be covered, for example. Substantially half of each cell is preferably covered. A symmetry disruption can be achieved by covering a portion or half of the cell. This is in particular sensible when the properties to be determined can only be obtained by evaluation of symmetrical deformations. The determination of an average optical flow in this case as a rule only produces a result that can be evaluated when such a symmetry disruption is carried out in the measurement.

The calculated optical flows can preferably first be converted into clearer individual values that are easier to evaluate in the evaluation in step d). For example, the respective optical flow of the respective two spatial intensity patterns that are consecutive in time can for this purpose be converted into two respective values OFx and OFy. The calculation of these values can, for example, take place in that the respective (two-dimensional) optical flow is projected once onto an x axis and once onto a y axis linearly independent with respect to the x axis, with the respective mean value then being formed over all the pixels of the respective projection. OFx and OFy would then finally respectively correspond to one of these mean values. However, a different value, e.g. the sum of the individual values, can also be used instead of the mean value of the individual values. The two values OFx and OFy can in principle be calculated for each of the determined optical flows, whereby the data volume is substantially reduced since ultimately only two simple values have to be processed and further evaluated instead of a whole vector image per optical flow.

On the use of the just described preferred evaluation method, a very small demand on memory space results from the use of the optical flow as the measurement variable since the optical flow can be given by only two values (OFx and OFy) in the evaluation of the optical flow. This ensures a fast processing of the signal. In conventional instruments, this is in contrast with a full image of a camera that is more memory intensive and more process intensive by some orders of magnitude.

Subsequently, one signal can be generated over the time OFx(t) and one signal can be generated over the time OFy(t) for every individual cell from the values OFx and OFy of the optical flows. In this manner, a signal pair OFx(t) and OFy(t) can be ultimately obtained for every analyzed cell. A value for a specific property of the cell can finally be associated with this signal pair. This is preferably done using a calibration. The signals OFx(t) and OFy(t) can, for example, also be illustrated within a graph. Properties of the cell can then be deduced from the progression of the graph. However, the observation of one of the values OFx(t) or OFy(t) alone can also provide information on the individual cell.

The present invention also relates to an apparatus for analyzing cells including
- a unit for separating cells;
- a unit for spatially resolved radiation intensity measurement that is configured such that it can prepare a time sequence of intensity patterns of an electromagnetic radiation emanating from and/or influenced by a separated cell while the cell passes through a measurement region of the unit for spatially resolved radiation intensity measurement; and
- a processing unit for calculating the optical flow of a respective two of the prepared intensity patterns and for evaluating the calculated optical flows.

A preferred embodiment of the apparatus in accordance with the invention is characterized in that the apparatus includes an additional unit for evaluating the calculated optical flows. The evaluation can in this manner be carried out either partially or also completely by this additional unit, whereby complicated evaluation methods or also graphical evaluations are also possible. An external computer can e.g. be used as the additional unit for evaluation that preferably has special software for the evaluation.

In a further preferred embodiment, the apparatus includes a radiation source. The radiation source is selected from the group comprising coherent radiation sources, partially coherent radiation sources, incoherent radiation sources, dot-shaped radiation sources, areal radiation sources, and combinations hereof. A radiation source for dark field illumination can also be used.

It is furthermore preferred that the unit for spatially resolved radiation intensity measurement includes a geometrical arrangement of electronic components that preferably comprises a photodiode, a CCD sensor and/or a camera.

A further preferred embodiment of the apparatus in accordance with the invention is characterized in that the apparatus includes a system for imaging the cells on the unit for spatially resolved radiation intensity measurement. This system can e.g. be a lens system. Such a lens system can, for example, be prepared using known processes from lithography, with the structure preferably being written directly into the photoresist. The imaging system could, however, also be implemented by a simple pinhole aperture. The resolution and the signal level of the radiation emanating from the cells can be increased by the system for imaging the cells, whereby a qualitatively better analysis of the cells becomes possible, in particular with a weak radiation of the cells.

It is further preferred that the unit for spatially resolved radiation intensity measurement and the processing unit are arranged on a common semiconductor chip. If the apparatus should additionally include a radiation source and/or an additional unit for evaluating the calculated optical flows, this radiation source and/or this additional unit for evaluating the calculated optical flows can also be arranged on said common semiconductor chip. This embodiment is particularly advantageous since a particularly space-saving apparatus is thus obtained that can also be configured as a portable version.

In accordance with a further preferred embodiment, the unit for separating cells is a microchannel, preferably a microfluidic channel. The microchannels can, for example, be prepared using known processes from lithography. The structure can be directly written into photoresist for this purpose.

It is further preferred that the apparatus in accordance with the invention includes a cell sorter, preferably a controllable gate. In this embodiment, the cells cannot only be analyzed fast, inexpensively, and in a simple manner by the apparatus, but a sorting of the cells immediately subsequent to the analysis of the cells is also possible with reference to the analyzed properties.

It is particularly preferred that the apparatus in accordance with the invention for analyzing cells or one of the described embodiments thereof is an apparatus for carrying out the method in accordance with the invention for analyzing cells or one of the described preferred variants thereof.

A large number of advantages over conventional methods in (deformation) cytometry) result through the invention. The apparatus in accordance with the invention can be operated using mass-produced products from the electronics industry, which results in very low costs, a very simple performability, and a very simple realizability and putting into operation.

The prices are also lower by some orders of magnitude with respect to a high-speed camera due to the wide availability of sensors that can be used as a unit for spatially resolved radiation intensity measurement (e.g. mouse sensors). The apparatus in accordance with the invention furthermore does not require any microscope, which again reduces the costs by a substantial amount. The complete system can be integrated on a computer chip thanks to the omission of large space-intensive instruments such as a microscope and a camera. Not only the setting of the measurement chamber is thereby simplified (no trained laboratory staff required, reduction of the factor humans), but the potential production costs are also greatly reduced.

The area of use of the instrument is expanded to the same degree by the low costs. The low investment costs allow the opening up of completely new areas of business or customers. In addition, the instrument can be designed as completely portable and can thus be relocated easily as required. A use in technically less widely developed regions is also conceivable.

The dyeing process is dispensed with in contrast with fluorescence cytometry. That is, the costs for specific dyes are saved as well as the time-intensive dyeing process.

In a preferred embodiment, the apparatus in accordance with the invention can include a plurality of units for separating cells and/or a plurality of units for the spatially resolved radiation intensity measurement. This makes it possible to parallelize the analysis process to a very high degree. Such an integration, i.e. an installation of a plurality of sensors and channels in a cytometer, is not a problem with the aid of today's semiconductor and chip technologies. This increases the number of analyzed cells per second and thus produces a result that is even more resilient.

In summary, the following advantages thus inter alia result for the present invention:
low infrastructure costs
low consumable costs
faster, more robust calculation than RT DC (real time deformability cytometry)
high throughput rate
integrable on a chip
simple setting of the apparatus
parallelizable
small user instruments possible
marker-free The method for analyzing cells in accordance with the invention or one of its preferred variants is preferably carried out using an apparatus for analyzing cells in accordance with the invention or using one of the described preferred embodiments thereof.

The present invention will be explained in more detail with reference to the following Figures and examples without restricting the invention to the specifically shown parameters.

FIG. 1 shows a specific embodiment of the apparatus in accordance with the invention in two different views. A side view can be seen in the upper image. The lower image shows a bird's eye view. The apparatus shown includes a microchannel 120. It is shown how a cell 110, 111 flows through the microchannel 120, with the cell 110 first being separated and deformed (111) at the inlet of the channel. In addition, the apparatus shown includes a computer chip 130 that includes a laser 140, a camera 150, and a processing unit 160. A lens system 170 is arranged between the computer chip 130 and the microchannel 120. The cell 111 passes through the measurement region 180 of the camera 150 after it has been separated. The cell 111 is here irradiated with electromagnetic radiation from the laser. On the passing through of the measurement region 180, the cells is imaged on the camera 150 with the aid of the lens system 170, with a time sequence of spatial intensity patterns of the electromagnetic radiation emanating from the cell being prepared with the aid of the camera 150. The optical flows of two respective ones of the spatial intensity patterns for the total sequence of intensity patterns are subsequently calculated with the aid of the processing unit 160. The optical flows are subsequently evaluated either directly by the processing unit 160 or by an external unit, not shown.

A possible variant for evaluating the optical flows in the method in accordance with the invention will be illustrated in the following with reference to an exemplary measurement. The data shown are real measurement results. It is shown here that specific properties such as the shape and size of a cell moving in a microfluidic channel can be determined with the aid of the optical flow.

For this purpose, two different cell shapes were tested, a round cell and a bullet-shaped cell. Both cells are shown schematically in FIG. 2.

Figure 2:
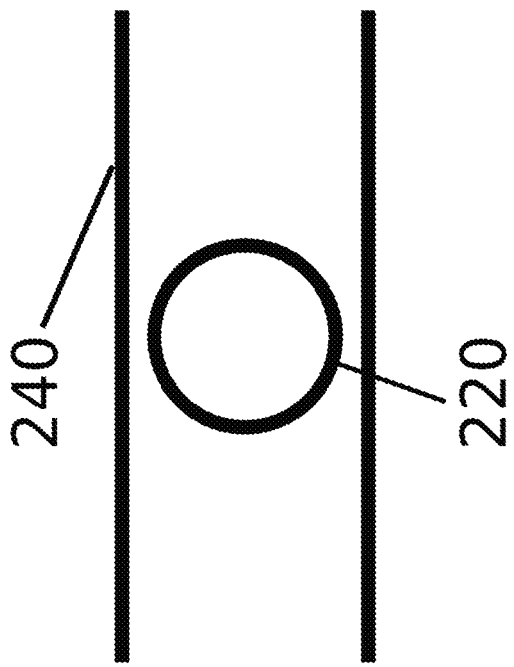
Figure 2:
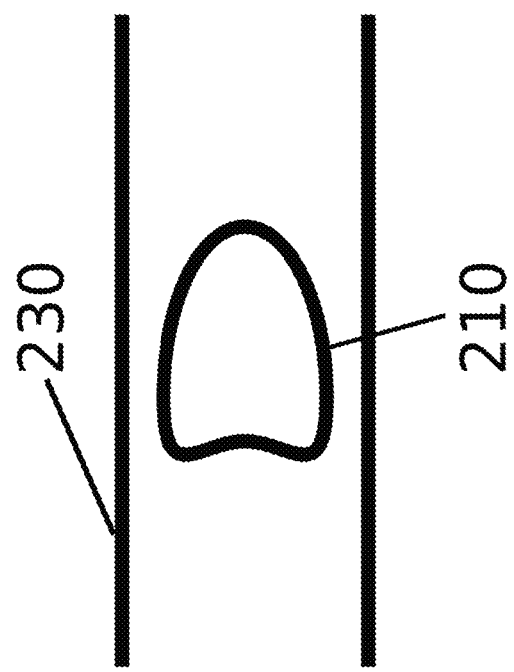

FIG. 2 shows a schematic representation of a bullet-shaped cell 210 at the left. This shape occurs, for example, if initially round cells are sheared and thus deformed on the flowing through of a channel due to a pressure gradient over the cross-section of the channel. A spherical cell 220 (e.g. a leukocyte) is shown at the right in FIG. 2 that clearly differs from the bullet-shaped cell. The margin of the channels 230, 240 is likewise visible.

A cell moves through the channel at a constant speed during the measurement. A high-speed camera was used for the system test. The optical flow was calculated from the images in a separate step from image to image with the aid of the Horn-Schunk method. This delivers an optical flow for every pixel of the image. The OF of all the pixels of an image were then added together. An expansion of the method was carried out such that a portion of the channel is not covered for a symmetry disruption, but rather the upper and lower image halves are observed separately from one another in the calculation of the OF. The OF signal results from this as OFx=Ofxbottom+OFxtop and Ofybottom−OFytop. This does not represent a restriction of the method shown. The x component here corresponds to the signal over the time OFx(t) and the y component corresponds to the signal over the time OFy(t). To achieve a high flow rate and to generate sufficient deformation by shear forces in the channel, the cells have to flow through the channel as fast as possible. It is ensured at a selected speed of approximately 4.85 cm/s that both the deformation due to the shear in the channel is large enough and the flow rate of cells is sufficient to obtain enough cells per unit of time for a fast and statistically meaningful measurement.

Figure 3:
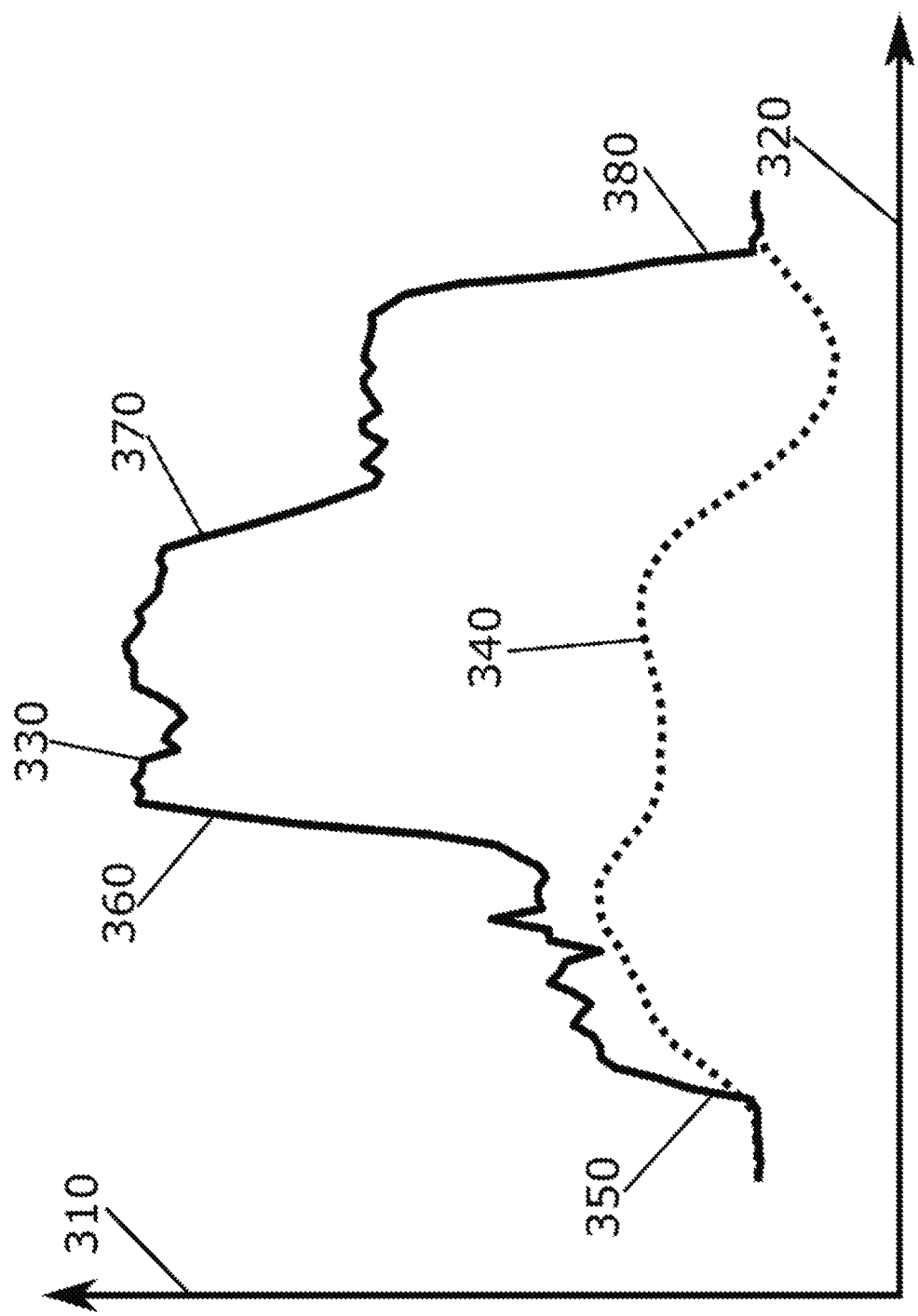

FIG. 3 shows a graphical representation of the optical flow of a real measured bullet-shaped cell comparable with the schematic drawing of FIG. 2 on the passing through of the field of view of the sensor. The data were processed as follows: The optical flow was found with the aid of the Matlab function "opticalFlowHS" and was subsequently smoothed to compensate noise in the signal and to facilitate the further data processing. The optical flow 310 is applied over the time 320 on the axes. The solid curve 330 shows the extent OFx(t) while the dashed curve 340 represents the extent OFy(t). As soon as the cell enters into the field of view of the sensor, the flow increases in the x direction (350). The OF increases for so long until the rounded portion of the cell is fully in the field of view. If it moves further in, the Of only changes a little until the rear end of the cell is located in the region of the sensor (360). If the cell moves through the channel and is fully visible, the OF has a constant value. Only when the cells leaves the field of view again does the OF reduce in stages (370) until it is again at 0 when the cell has completely left the sensor region (380). Different parameters can now be calculated from this curve. The time until the cell is completely within the sensor region or has left it again can be used for calculating the cell size. The transit time required allows a conclusion on the cell speed and the different levels of the plateaus on the entry and departure are a measure for the asymmetry of the cell. The shape (bullet-shaped, elliptical, round) of the cell can be determined together with the integrated value of the OFy(t) signal.

Figure 4:
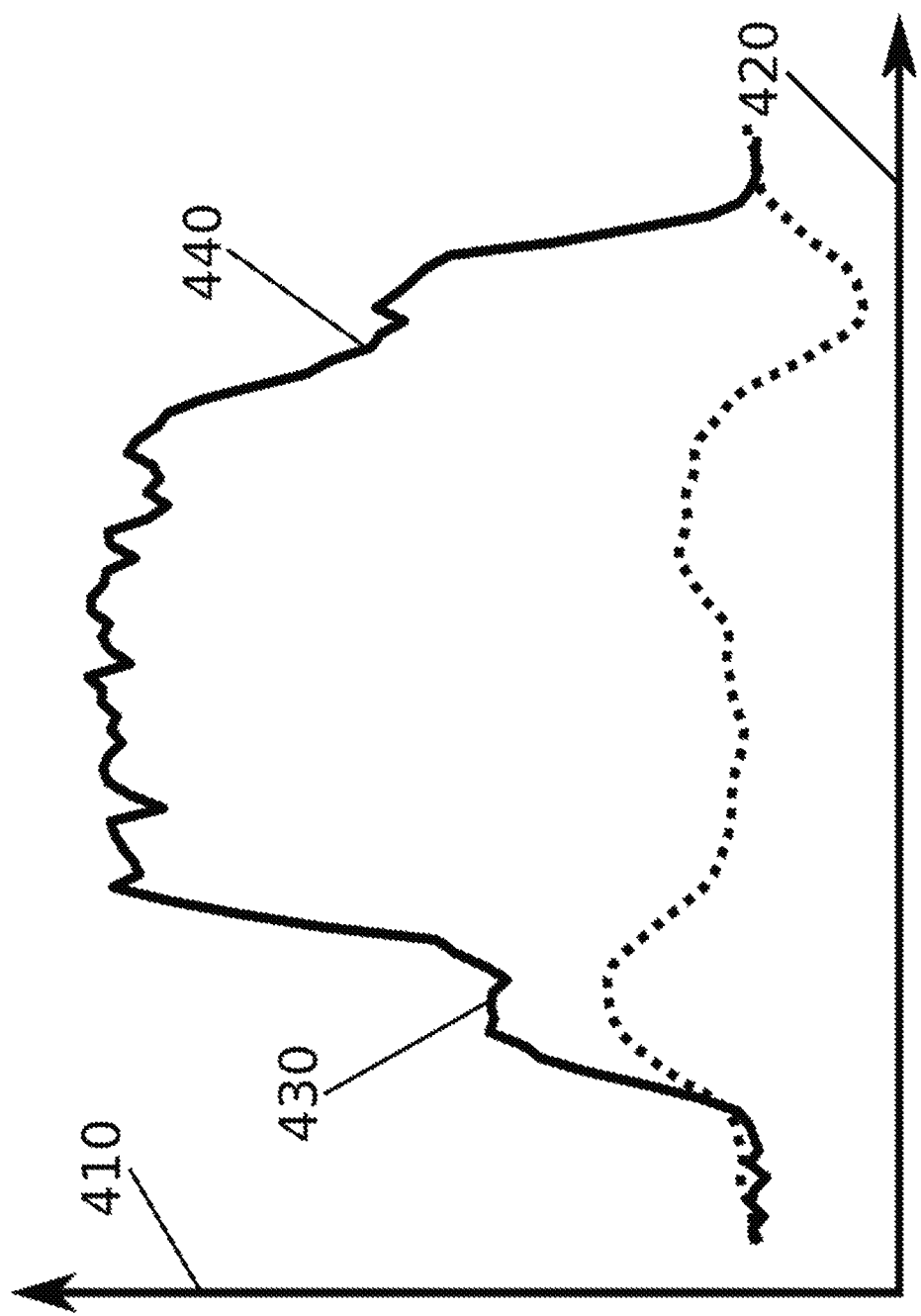

The OF signal of a real round cell such as is schematically shown in FIG. 2 is shown schematically in FIG. 4 for comparison. The axes 410, 420 are the same as in FIG. 3, but the scaling has been selected differently for better clarity. It can be recognized that the plateaus in the round cell are considerably less pronounced (430, 440) than in the bullet-shaped cell in FIG. 3. Together with the much smaller value of the integrated y signal, a bullet-shaped cell can be distinguished from a spherical cell with reference to the diagrams. The measurement data clearly show that unambiguous data are obtained by the method in accordance with the invention that result (optionally in conjunction with reference values and a so-called look-up table) in the identification of a cell/cell type or of the deformation of the cell or of other properties of the cell. The data acquired from the method were compared with the results of conventional measurements using imaging methods. Both the cell size and the flow rate were correctly determined by the method presented above. In the examples shown above, the difference in cell shape can be recognized so well that they can easily be distinguished by a program based on threshold values, which quickly restricts the search range of a downstream look-up table.

The invention claimed is:

1. A method for analyzing cells comprising:
a) separating cells with the aid of a unit for separating cells to obtain single separate cells;
b) passing the single separate cells through a measurement region of a unit for spatially resolved radiation intensity measurement, wherein a time sequence of spatial intensity patterns of an electromagnetic radiation emanating from and/or influenced by the cell is prepared for at least one of the single separate cells on passing through the measurement region;
c) calculating an optical flow of each of two respective spatial intensity patterns for at least a portion of the time sequence of intensity patterns with the aid of a processing unit, wherein the optical flow is a parameter that describes a spatial variation or movement of intensities from a first one of the two respective spatial intensity patterns to a second one of the two respective spatial intensity patterns over time and can be shown as a vector field, with the vector field ultimately representing a spatial progression of intensities between two points in time; and
d) evaluating the calculated optical flows,
wherein at least one property of the cell is determined during evaluating the calculated optical flows in step d), wherein the at least one property of the cell is selected from the group consisting of shape of the cell, cell size, cell volume, cell type, cell morphology, and deformation of the cell.

2. The method of claim 1, wherein
the evaluation of the calculated optical flows in d) is carried out by the processing unit or by an additional unit for evaluating the calculated optical flows; or
the evaluation of the calculated optical flows in d) is carried out partially by the processing unit and partially by the additional unit for evaluating the calculated optical flows.

3. The method of claim 1, wherein the at least one cell is irradiated with electromagnetic radiation on the preparation of the time sequence of spatial intensity patterns in b).

4. The method of claim 3, wherein the irradiation takes place by a natural radiation source and/or by an artificial radiation source.

5. The method of claim 4, wherein the artificial radiation source is selected from the group consisting of coherent radiation sources, partially coherent radiation sources, incoherent radiation sources, dot-shaped radiation sources, areal radiation sources, and combinations thereof.

6. The method of claim 1, wherein so many intensity patterns for a respective one cell are prepared on the preparation of the time sequence of spatial intensity patterns in step b) that as few discontinuities as possible occur in the optical flows to be evaluated.

7. The method of claim 1, wherein the at least one property is determined from a plurality of cells that pass through the measurement region of the unit for spatially resolved radiation intensity measurement and wherein the cells are sorted with the aid of a cell sorter into at least two groups subsequently to step d) on the basis of differences in this at least one property.

8. An apparatus for analyzing cells including
at least one unit for separating cells to obtain single separate cells;
at least one unit for spatially resolved radiation intensity measurement that is configured such that it can prepare a time sequence of intensity patterns of an electromagnetic radiation emanating from a single separate cell while the cell passes through a measurement region of the unit for spatially resolved radiation intensity measurement; and
a processing unit for calculating an optical flow of a respective two of the prepared intensity patterns and for evaluating the calculated optical flows, in which evaluating at least one property of the cell is determined, wherein the at least one property of the cell is selected from the group consisting of shape of the cell, cell size, cell volume, cell type, morphology, and deformation of the cell;
wherein the optical flow is a parameter that describes a spatial variation or movement of intensities from a first one of the two respective spatial intensity patterns to a second one of the two respective spatial intensity patterns over time and that can be shown as a vector field, with the vector field ultimately representing the spatial progression of intensities between two points in time.

9. The apparatus of claim 8, which includes an additional unit for evaluating the calculated optical flows.

10. The apparatus of claim 8, wherein the apparatus includes a radiation source.

11. The apparatus of claim 10, wherein the radiation source is selected from the group consisting of coherent radiation sources, partially coherent radiation sources, incoherent radiation sources, dot-shaped radiation sources, areal radiation sources, and combinations thereof.

12. The apparatus of claim 9, wherein the unit for spatially resolved radiation intensity measurement includes a geometrical arrangement of electronic components.

13. The apparatus of claim 12, wherein the geometric arrangement comprises a photodiode, a charge-coupled device (CCD) sensor and/or a camera.

14. The apparatus of claim 9, wherein the apparatus includes a system for imaging the cells on the unit for spatially resolved radiation intensity measurement.

15. The apparatus of claim 9, wherein the unit for spatially resolved radiation intensity measurement and the processing unit are arranged on a common semiconductor chip.

16. The apparatus of claim 9, wherein the unit for separating cells is a microchannel.

17. The apparatus of claim 9, wherein the apparatus is a cell sorter.

18. The method of claim 1, which is carried out utilizing an apparatus for analyzing cells including
- at least one unit for separating cells;
- at least one unit for spatially resolved radiation intensity measurement that is configured such that it can prepare a time sequence of intensity patterns of an electromagnetic radiation emanating from a separated cell while the cell passes through a measurement region of the unit for spatially resolved radiation intensity measurement; and
- a processing unit for calculating the optical flow of a respective two of the prepared intensity patterns and for evaluating the calculated optical flows.

* * * * *